(12) United States Patent
Hsiao

(10) Patent No.: US 9,398,276 B2
(45) Date of Patent: Jul. 19, 2016

(54) PROJECTION DEVICE AND CONTROL METHOD THEREOF

(71) Applicant: LITE-ON TECHNOLOGY CORPORATION, Taipei (TW)

(72) Inventor: Chun-Lai Hsiao, Taipei (TW)

(73) Assignee: LITE-ON TECHNOLOGY CORPORATION, Taipei (TW)

(*) Notice: Subject to any disclaimer, the term of this patent is extended or adjusted under 35 U.S.C. 154(b) by 3 days.

(21) Appl. No.: 14/597,865

(22) Filed: Jan. 15, 2015

(65) Prior Publication Data

US 2015/0227031 A1 Aug. 13, 2015

(30) Foreign Application Priority Data

Feb. 7, 2014 (CN) .......................... 2014 1 0044856

(51) Int. Cl.
*H04N 9/31* (2006.01)
*G03B 21/28* (2006.01)

(52) U.S. Cl.
CPC .............. *H04N 9/3129* (2013.01); *G03B 21/28* (2013.01); *H04N 9/3135* (2013.01); *H04N 9/3194* (2013.01)

(58) Field of Classification Search
CPC .. G03B 21/28; G03B 21/147; G03B 21/2033; H04N 9/3129; H04N 9/3185; H04N 9/3194
See application file for complete search history.

(56) References Cited

U.S. PATENT DOCUMENTS

| | | | | |
|---|---|---|---|---|
| 8,251,517 B2* | 8/2012 | Gibson | ................ | H04N 9/3129 353/121 |
| 2007/0070481 A1* | 3/2007 | Nishikawa | ............ | B81B 3/0094 359/213.1 |
| 2008/0001850 A1* | 1/2008 | Champion | ........... | G02B 26/101 345/7 |
| 2009/0262104 A1* | 10/2009 | Ikegami | ................... | G09G 3/02 345/212 |
| 2011/0001888 A1* | 1/2011 | Brown | ................. | G02B 26/085 348/744 |
| 2012/0032875 A1* | 2/2012 | Sprowl | ................... | G02B 27/01 345/156 |
| 2014/0092369 A1* | 4/2014 | Seno | ................. | G03B 21/2033 353/69 |

* cited by examiner

Primary Examiner — Sultan Chowdhury
(74) Attorney, Agent, or Firm — Rabin & Berdo, P.C.

(57) ABSTRACT

A control method of a projection device is provided. The control method comprises following steps. The light source generates a light beam towards a micro electro mechanical system (MEMS) module. The scan driver outputs a first direction scan signal and a second direction scan signal to the MEMS module for enabling the MEMS module to reflect the light beam to a projection surface. The first direction control system of the MEMS module is a second-order system and has a resonance frequency, and the first direction scan signal has a frequency within a frequency range containing the resonance frequency.

12 Claims, 5 Drawing Sheets

PROJECTION DEVICE AND CONTROL METHOD THEREOF

This application claims the benefit of People's Republic of China application Serial No. 201410044856.9, filed Feb. 7, 2014, the subject matter of which is incorporated herein by reference.

BACKGROUND OF THE INVENTION

1. Field of the Invention

The invention relates in general to a projection device and a control method thereof, and more particularly to a projection device which changes the way of controlling the MEMS module and a control method thereof.

2. Description of the Related Art

The micro projection device normally uses a micro electro mechanical system (MEMS) module to reflect a light beam generated by a light source such that the light beam is projected on a projection surface for generating desired images. In general, the reflection angle of the reflection surface of the MEMS module is controlled by an x-direction (the horizontal direction) control signal and a y-direction (the vertical direction) control signal, such that the light beam can scan along the horizontal direction and the vertical direction to form desired images.

In terms of the y-direction scanning, different control voltages will result in different reflection angles of the reflection surface of the MEMS module, and the projection angle of the light beam along the y direction is determined according to the reflection angles of the reflection surface. In order to increase the projection range along the y direction, the magnitude of the control voltage needs to be increased. However, the control voltage inputted to the MEMS module has a predetermined upper limit, and if the inputted control voltage is over the predetermined upper limit, it may lead to pull-in effect or damage in MEMS module.

Therefore, how to provide a control method of a projection device capable of increasing the projection range along the y direction and at the same time avoiding the MEMS pull-in effect or MEMS module damage has become a prominent task for the industries.

SUMMARY OF THE INVENTION

The invention is directed to a projection device and a control method thereof.

According to one embodiment of the present invention, a control method of a projection device is provided. The control method comprises following steps. The light source generates a light beam towards a micro electro mechanical system (MEMS) module. The scan driver outputs a first direction scan signal and a second direction scan signal to the MEMS module for enabling the MEMS module to reflect the light beam to a projection surface. The first direction control system of the MEMS module is a second-order system and has a resonance frequency, and the first direction scan signal has a frequency within a frequency range containing the resonance frequency.

According to one embodiment of the present invention, a projection device comprising a light source, a MEMS module and a scan driver is provided. The light source generates a light beam. The MEMS module reflects the light beam to a projection surface. The scan driver outputs a first direction scan signal and a second direction scan signal to the MEMS module. The first direction control system of the MEMS module is a second-order system and has a resonance frequency, and the frequency of the first direction scan signal is within a frequency range containing the resonance frequency.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
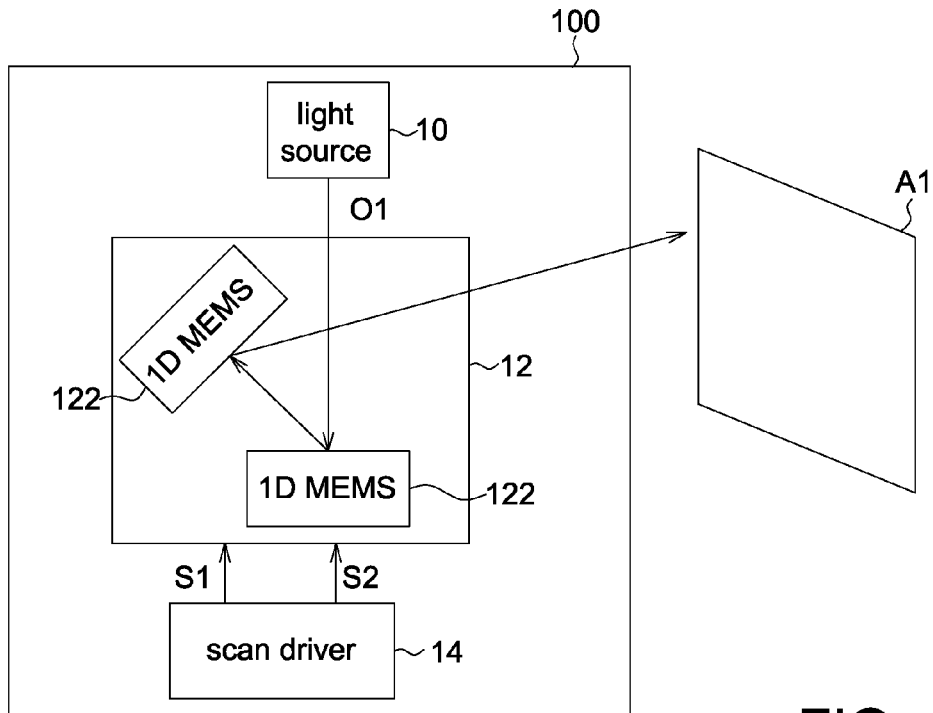
FIG. 1 shows a block diagram of a projection device according to an embodiment of the invention.

FIG. 1 shows a block diagram of a projection device according to an embodiment of the invention. The projection device 100 comprises a light source 10, a micro electro mechanical system (MEMS) module 12 and a scan driver 14. The light source 10 generates a light beam O1. The MEMS module 12 reflects the light beam O1 to a projection surface A1 to generate an image on a projection surface A1. The scan driver 14 outputs a first direction scan signal S1 and a second direction scan signal S2 to the MEMS module 12. A first direction control system of the MEMS module 12 is a second-order system and has a resonance frequency, and the frequency of the first direction scan signal S1 is within a frequency range containing the resonance frequency.

The said first direction is, for example, the y direction (the vertical direction), and the second direction is, for example, the x direction (the horizontal direction). In the present embodiment, the MEMS module 12 comprises a first one-dimensional MEMS (1D MEMS) 120 and a second one-dimensional (1D MEMS) MEMS 122, respectively controlled by the first direction scan signal S1 and the second direction scan signal S2 for controlling the reflection angle of the light beam O1 along the y direction and the x direction. In another embodiment, the MEMS module 12 may comprise a two-dimensional MEMS (2D MEMS) capable of controlling the reflection angle of the light beam O1 along both the x direction and the y direction.

Figure 2:
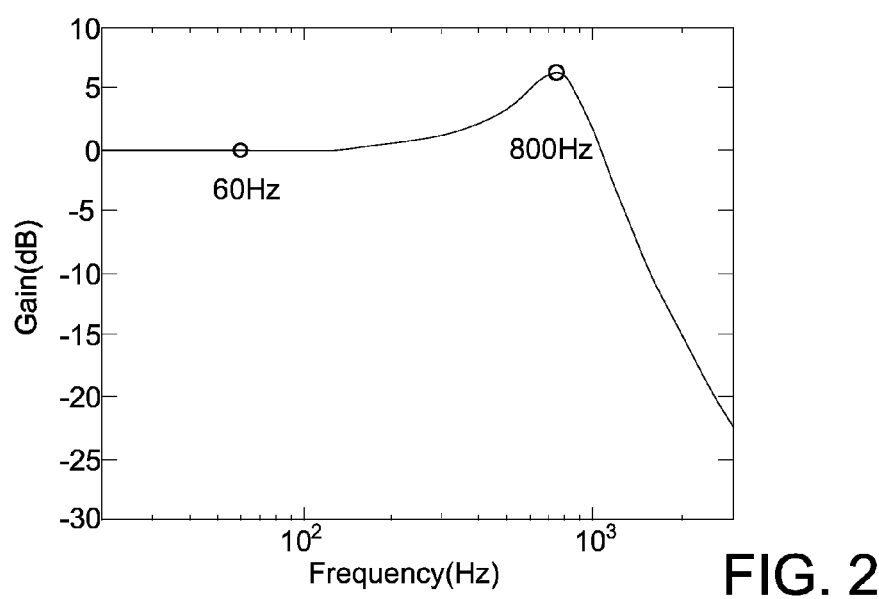
FIG. 2 shows a Bode plot of a first direction control system of a MEMS module.

FIG. 2 shows a Bode plot of a first direction control system of a MEMS module. The Bode plot illustrates a frequency response of the first direction control system whose input is a frequency of the control voltage and output is a field angle of the MEMS module 12 operating in the frequency. In an ordinary projection mode, the frequency of the first direction scan signal S1 (the y-direction scan signal) of the MEMS module 12 is 60 Hz. As shown in FIG. 2, the signal of 60 Hz corresponds to a gain of 0 dB, that is, the gain value is 1. Given that the frequency of the first direction scan signal S1 is 60 Hz, if the amplitude of the first direction scan signal S1 is doubled, the field angle of the MEMS module 12 will be doubled as well. Also, as shown in FIG. 2, if the frequency of the first direction scan signal S1 is the resonance frequency of the first one-dimensional MEMS 120, i.e., 800 Hz, the gain is about 6 dB, that is, the gain value is 2. When the gain value is equal to 2, this implies that if the amplitude of the first direction scan signal S1 whose frequency is equal to the resonance frequency of 800 Hz is doubled, the field angle of the MEMS module 12 will be quadrupled. Therefore, when the frequency of the first direction scan signal S1 is around the resonance frequency of 800 Hz, the same amplitude for the MEMS module 12 can achieve a larger first direction field angle.

Figure 3:
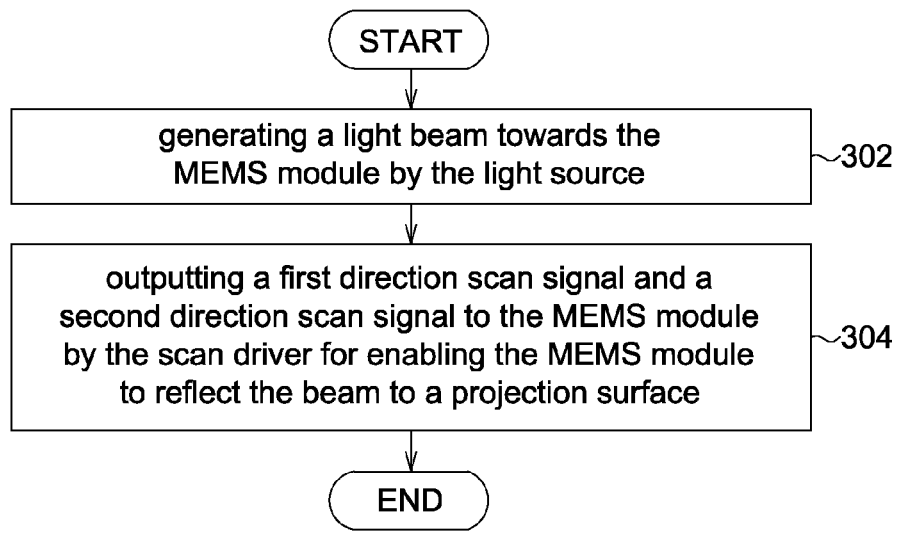
FIG. 3 shows a flowchart of a control method of a projection device.

A control method of a projection device is provided in an embodiment of the invention. FIG. 3 shows a flowchart of a control method of a projection device according to an embodiment of the invention. Firstly, the method begins at step 302, a light beam O1 is generated towards the MEMS module 12 by the light source 10. Next, the method proceeds to step 304, a first direction scan signal S1 and a second direction scan signal S2 are outputted to the MEMS module 12 by the scan driver 14 for enabling the MEMS module 12 to reflect the light beam O1 to a projection surface A1. The first direction control system of the MEMS module 12 is a second-order system and has a resonance frequency, and the frequency of the first direction scan signal S1 is within a frequency range containing the resonance frequency. Although the control method is exemplified by the projection device 100 of FIG. 1 in the present embodiment of the invention, the control method can also be used in other embodiments.

Figure 4:
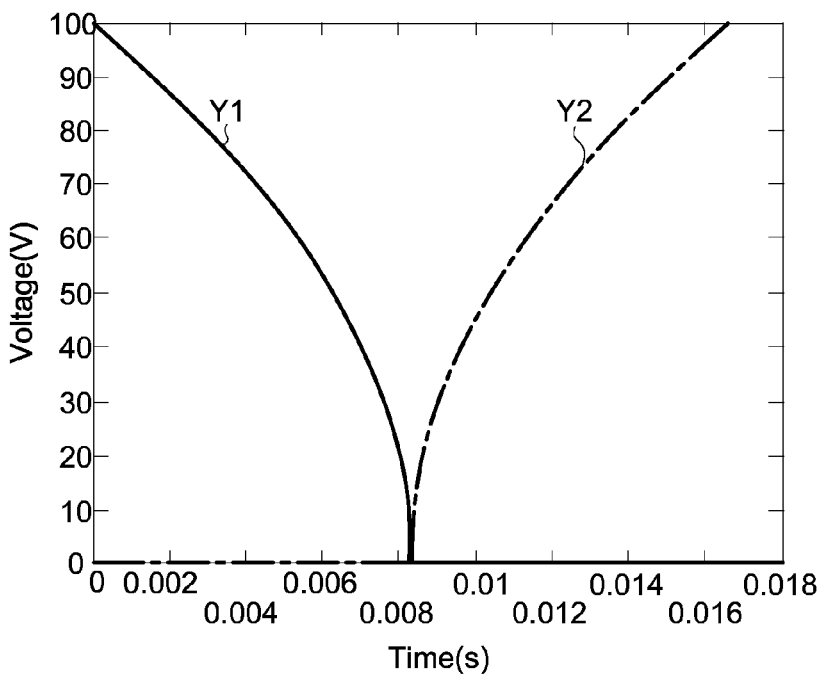
FIG. 4 shows a voltage waveform of a first direction scan signal S1 generated by a projection device in an ordinary projection mode.
Figure 5:
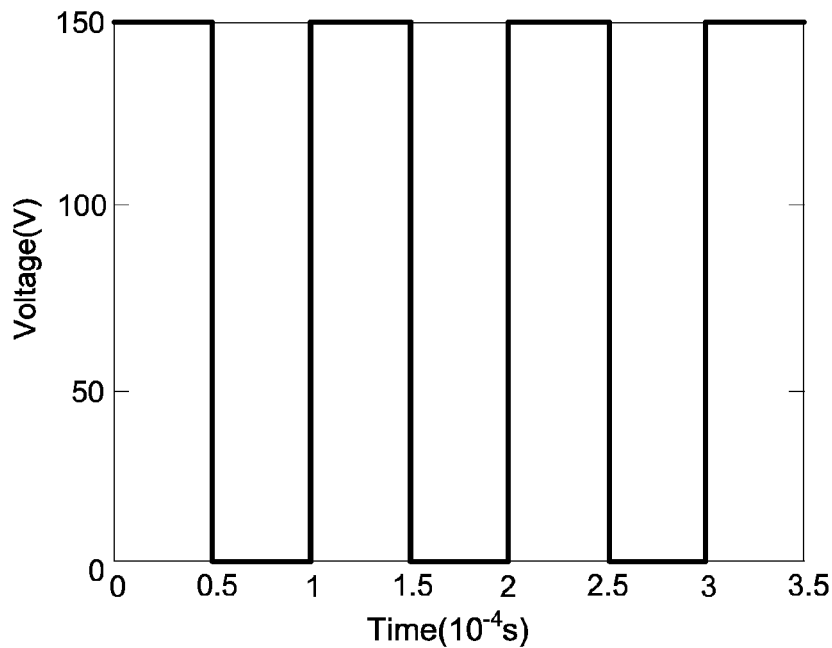
FIG. 5 shows a voltage waveform of a second direction scan signal S2 generated by a projection device in an ordinary projection mode.
Figure 6:
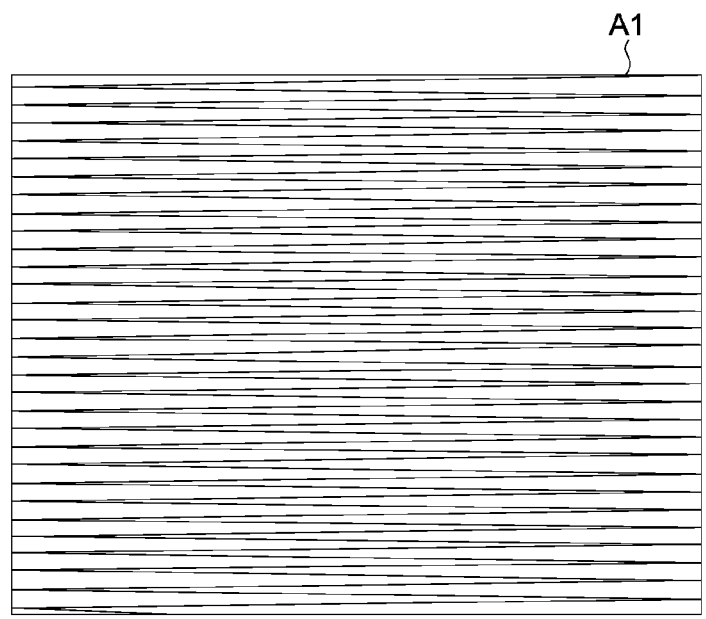
FIG. 6 shows scanning tracks of a light beam generated on a projection surface by a projection device in an ordinary projection mode.

Another embodiment is disclosed below for descriptions purpose. FIG. 4 shows a voltage waveform of a first direction scan signal S1 generated by a projection device 100 in an ordinary projection mode. The first direction scan signal S1 comprises a scan signal Y1 and a scan signal Y2 respectively controlling two opposite ends of the MEMS module 12 along the first direction (y direction) for rotating the MEMS module 12 back and forth such that the light beam O1 scans back and forth on the projection surface A1 along the y direction. As shown in FIG. 4, each of the frequency of the y-direction scan signals Y1 and Y2 is 60 Hz and each of the amplitude the y-direction scan signals Y1 and Y2 is 100 V. FIG. 5 shows a voltage waveform of a second direction scan signal S2 generated by a projection device 100 in an ordinary projection mode. As shown in FIG. 5, the second direction scan signal S2 is a square-wave signal having a frequency of 10 KHz and an amplitude of 150 V. FIG. 6 shows scanning tracks of a light beam O1 generated on a projection surface A1 by a projection device 100 in an ordinary projection mode. As shown in FIG. 6, after the MEMS module 12 receives the first direction scan signal S1 of FIG. 4 and the second direction scan signal S2 of FIG. 5, the scanning tracks of the light beam O1 on the projection surface A1 form a raster scan. That is, the light beam O1 performs left to right scanning along the x direction and performs top to bottom scanning along the y direction.

Figure 7:
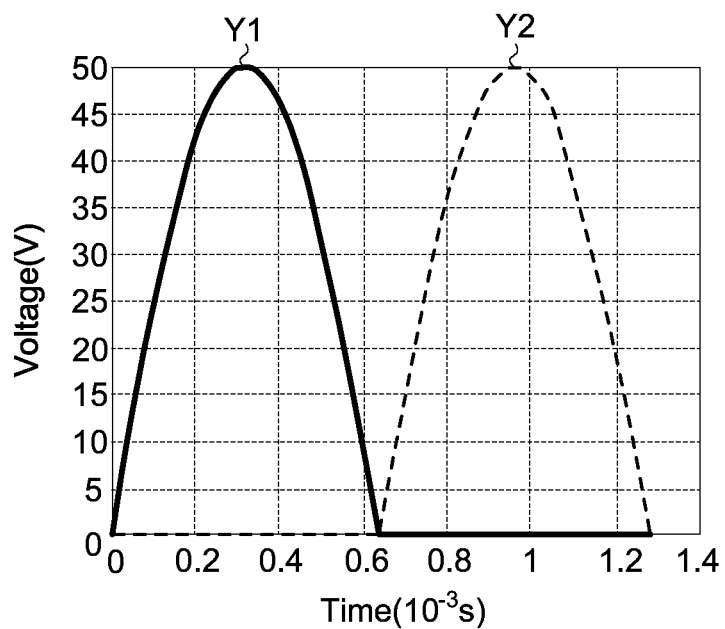
FIG. 7 shows a voltage waveform of a first direction scan signal S1 generated by a projection device not in an ordinary projection mode.
Figure 8:
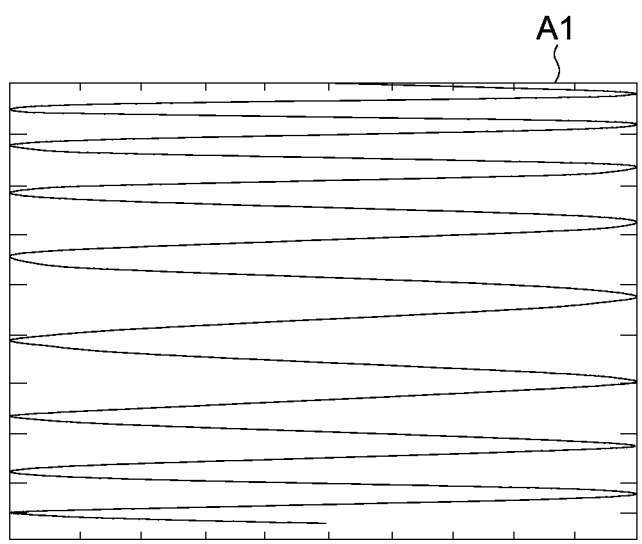
FIG. 8 shows scanning tracks of a light beam generated on a projection surface by a projection device not in an ordinary projection mode.

FIG. 7 shows a voltage waveform of a first direction scan signal S1 generated by a projection device 100 not in an ordinary projection mode. In the present embodiment, when the projection device 100 is not in an ordinary projection mode, the first direction scan signal S1 is, for example, a sine wave signal having a frequency of 800 Hz and an amplitude of 50 V. FIG. 8 shows scanning tracks of a light beam O1 generated on a projection surface A1 by a projection device 100 not in an ordinary projection mode. After the MEMS module 12 receives the first direction scan signal S1 of FIG. 7 and the second direction scan signal S2 of FIG. 5, the scanning tracks of the light beam O1 on the projection surface A1 are as shown in FIG. 8. FIG. 6 and FIG. 8 show that even when the frequency of the first direction scan signal S1 is increased and the amplitude of the first direction scan signal S1 is halved, the same projection range still can be generated in the y direction. Therefore, given that the frequency of the first direction scan signal S1 approximates the resonance frequency, the MEMS module 12 still can achieve the same field angle with a smaller amplitude of the first direction scan signal S1. That is, given that the frequency of the first direction scan signal S1 approximates the resonance frequency, with the amplitude of the first direction scan signal S1 being slightly increased, the MEMS module 12 can achieve a larger field angle for enlarging the projection range along the first direction (the y direction).

In addition, FIG. 7 and FIG. 8 show that the light beam O1 performs a non-uniform motion on the projection surface A1 along the y direction. The region near the upper edge and lower edge of the projection surface A1 corresponds to the region near the wave peak (the time around 0.3 milliseconds) of the first direction scan signal S1 of FIG. 7. The corresponding light beam O1 near the upper edge and lower edge of the projection surface A1 has a lower scanning rate, and the motion of the corresponding light beam O1 along the first direction (the y direction) approximates a uniform motion. The scanning tracks generated by the light beam O1 are similar to the scanning tracks of FIG. 6 generated by a projection device in an ordinary projection mode. The middle region of the projection surface A1 corresponds to the region near the wave trough (the time around 0.6 milliseconds) of the sine wave first direction scan signal S1 of FIG. 7. The corresponding light beam O1 in the middle region has a higher scanning rate. Therefore, a photo detector can be disposed in the region near the upper edge or lower edge of the projection surface A1 for measuring the scanning direction of the light beam O1 or for calibrating the light beam O1. When the first direction scan signal S1 is operated in a frequency around the resonance frequency, the motion of the light beam O1 near the region of the upper edge or lower edge of the projection surface A1 approximates the scanning tracks of the light beam O1 in an ordinary projection mode. Therefore, the characteristics of the light beam O1 can be correctly measured. Since the photo detector is disposed near the region of the upper edge or lower edge of the projection surface A1, the photo detector neither occupies the space in the projection range in an ordinary projection mode nor affects the projection device displaying image frames in an ordinary projection mode.

Figure 9:
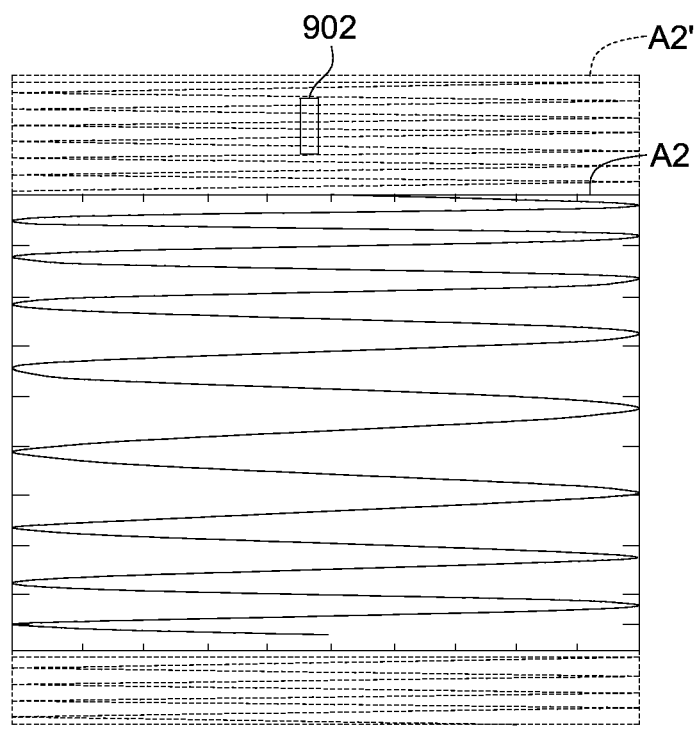
FIG. 9 shows scanning tracks on a projection surface by using a control method of a projection device according to an embodiment of the invention.

The embodiment for disposing a photo detector on the upper edge or lower edge of the increased projection range along the y direction for measuring optical characteristics of the light beam is stated below. FIG. 9 shows scanning tracks on a projection surface A2 by using a control method of a projection device according to an embodiment of the invention. With a photo detector 902 being disposed on the upper edge of the projection surface A2, the above method of increasing the field angle of the MEMS module 12 along the y direction by adjusting the frequency of the first direction scan signal S1 can increase the projection surface from projection surface A2 to projection surface A2' of the projection device 100 along the y direction. Based on the time which the light beam O1 takes to reach the light detector 902, the light detector 902 can determine the starting direction for oscillation in the x direction (that is, in the x direction, whether the light beam O1 starts to scan from left to right or from right to left) and accordingly perform necessary adjustment on the projection device 100 to avoid image phase difference.

In the present embodiment, given that the amplitude of the first direction scan signal S1 is lesser than a maximum allowable amplitude of the MEMS module 12 (the default upper limit of the control voltage), if the frequency of the first direction scan signal S1 is around the resonance frequency of the first direction control system, the field angle of the MEMS module 12 along the first direction can be increased such that the projection range along the y direction can be increased accordingly. If the resonance frequency of the first direction control system of the MEMS module 12 is 800 Hz, the frequency of the first direction scan signal S1 can be between 600 Hz~1000 Hz. However, the embodiment of the invention is not limited thereto, and the frequency range can be determined according to the system design. The amplitude of the first direction scan signal S1 is determined according to the frequency of the first direction scan signal S1 and the gain of the first direction control system. The amplitude of the first direction scan signal S1 is lesser than a maximum allowable amplitude of the MEMS module 12.

Another embodiment of the invention is stated below. If the first direction scan signal S1 has a frequency of 60 Hz and an amplitude of 100 V, the MEMS module 12 can reach a field angle of 15° along the y direction. If the scan signal along the y direction has a resonance frequency of 800 Hz, an amplitude of 50 V will suffice to achieve a field angle of 15°. Given that the scan signal along the y direction has a frequency of 60 Hz, the first direction scan signal S1 requires an amplitude of 110 V in order to achieve a field angle of 16° for the MEMS module 12. Meanwhile, the MEMS module 12 could be damaged when the voltage (110 V) is over the upper limit of the control voltage (e.g., 105 V) of the MEMS module 12. However, if the frequency of the first direction scan signal S1 is the resonance frequency, i.e. 800 Hz, the first direction scan signal S1 only requires an amplitude of 55 V to achieve a field angle of 16° along the y direction for the MEMS module 12. Therefore, without exceeding the maximum allowable amplitude of the MEMS module 12, the embodiment of the invention is capable of using a lower amplitude to achieve a larger field angle for increasing the projection range along the y direction. However, the above embodiments are for description purpose only, not for limiting the scope of the invention. The frequency and amplitude of the first direction scan signal S1 can be adjusted according to the characteristics of the first direction control system.

A projection device and a control method thereof are disclosed in above embodiments of the invention. The frequency of the first direction scan signal is determined according to the frequency response of the first direction control system. The amplitude of the first direction scan signal is determined according to the frequency of the first direction scan signal and the corresponding gain of the first direction control system to avoid the amplitude of the first direction scan signal exceeding a maximum allowable amplitude of the MEMS module. Thus, the pull-in effect or damage in MEMS module can be avoided and the projection range along the first direction can be enlarged. In addition, above embodiments of the invention are capable of using a lower amplitude to achieve a larger field angle for increasing the projection range along the first direction.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control method of a projection device, wherein the projection device comprises a light source, a scan driver and a micro electro mechanical system (MEMS) module, and the control method of a projection device comprises:
    generating a light beam towards the MEMS module by the light source; and
    outputting a first direction scan signal and a second direction scan signal to the MEMS module by the scan driver for enabling the MEMS module to reflect the light beam to a projection surface;
    wherein a first direction control system of the MEMS module has a resonance frequency, and a frequency of the first direction scan signal is within a frequency range containing the resonance frequency,
    wherein the frequency of the first direction scan signal is determined according to the frequency response of the first direction control system when an input thereto has a frequency of a control voltage and an output thereof is a field angle of the MEMS module operating in the frequency.

2. The control method of a projection device according to claim 1, wherein the first direction scan signal is a sine wave signal.

3. The control method of a projection device according to claim 1, wherein the second direction scan signal is a square-wave signal.

4. The control method of a projection device according to claim 1, wherein the frequency of the first direction scan signal is between 600 Hz~1000 Hz.

5. The control method of a projection device according to claim 1, wherein an amplitude of the first direction scan signal is determined according to the frequency of the first direction scan signal and a corresponding gain of the first direction control system, and the amplitude of the first direction scan signal is lesser than a maximum allowable amplitude of the MEMS module.

6. The control method of a projection device according to claim 1, wherein the first direction scan signal is a y-direction scan signal, and the second direction scan signal is an x-direction scan signal.

7. A projection device comprising:
    a light source for generating a light beam;
    a MEMS module for reflecting the light beam to a projection surface; and
    a scan driver for outputting a first direction scan signal and a second direction scan signal to the MEMS module for controlling the MEMS module;
    wherein a first direction control system of the MEMS module has a resonance frequency, and a frequency of the first direction scan signal is within a frequency range containing the resonance frequency,
    wherein the frequency of the first direction scan signal is determined according to the frequency response of the first direction control system when an input thereto has a frequency of a control voltage and an output thereof is a field angle of the MEMS module operating in the frequency.

8. The projection device according to claim 7, wherein the first direction scan signal is a sine wave signal.

9. The projection device according to claim 7, wherein the second direction scan signal is a square-wave signal.

10. The projection device according to claim 7, wherein the frequency of the first direction scan signal is between 600 Hz~1000 Hz.

11. The projection device according to claim 7, wherein an amplitude of the first direction scan signal is determined according to the frequency of the first direction scan signal and a corresponding gain of the first direction control system, and the amplitude of the first direction scan signal is lesser than a maximum allowable amplitude of the MEMS module.

12. The projection device according to claim 7, wherein the first direction scan signal is a y-direction scan signal, and the second direction scan signal is an x-direction scan signal.

* * * * *